(12) United States Patent
Mathur et al.

(10) Patent No.: US 11,557,898 B2
(45) Date of Patent: Jan. 17, 2023

(54) METHOD AND DEVICES FOR PROCESSING SENSOR DATA BY APPLYING ONE OR MORE PROCESSING PIPELINES TO THE SENSOR DATA

(71) Applicant: Nokia Technologies OY, Espoo (FI)

(72) Inventors: Akhil Mathur, Cambridge (GB); Sourav Bhattacharya, Cambridge (GB); Fahim Kawsar, Cambridge (GB); Nicholas Lane, Cambridge (GB); Mohammed Alloulah, Cambridge (GB); Chulhong Min, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 16/753,658

(22) PCT Filed: Nov. 6, 2018

(86) PCT No.: PCT/EP2018/080287
§ 371 (c)(1),
(2) Date: Apr. 3, 2020

(87) PCT Pub. No.: WO2019/091959
PCT Pub. Date: May 16, 2019

(65) Prior Publication Data
US 2021/0376604 A1    Dec. 2, 2021

(30) Foreign Application Priority Data
Nov. 10, 2017  (EP) ..................................... 17201078

(51) Int. Cl.
*H02J 3/00* (2006.01)
*H02J 3/14* (2006.01)

(52) U.S. Cl.
CPC .............. *H02J 3/003* (2020.01); *H02J 3/004* (2020.01); *H02J 3/14* (2013.01)

(58) Field of Classification Search
CPC ........................................................ H02J 3/003
See application file for complete search history.

(56) References Cited

U.S. PATENT DOCUMENTS

| | | | |
|---|---|---|---|
| 2008/0133956 A1* | 6/2008 | Fadell | G06F 1/3287 713/340 |
| 2013/0311794 A1* | 11/2013 | Stewart | H04W 52/0264 713/300 |

(Continued)

FOREIGN PATENT DOCUMENTS

WO    WO-2017074966 A1    5/2017

OTHER PUBLICATIONS

International Search Report for International Application PCT/EP2018/080287 dated Jan. 7, 2019.

(Continued)

*Primary Examiner* — Nathan L Laughlin
(74) *Attorney, Agent, or Firm* — Harness, Dickey & Pierce, P.L.C.

(57) ABSTRACT

In one embodiment, the method includes obtaining, by a first processing device, energy demand data representative of the energy consumption of respective tasks of a processing pipeline, obtaining, by the first processing device, battery availability data representative of the available energy of the batteries of other respective processing devices, for respective tasks of the processing pipeline, selecting, by the first processing device, one of the processing devices for executing the task, as a function of the energy demand data and the battery availability data, and controlling, by the first processing device, the execution of the respective tasks on the selected processing devices.

10 Claims, 2 Drawing Sheets

(56) References Cited

U.S. PATENT DOCUMENTS

2017/0215011 A1 7/2017 Goldstein
2018/0214028 A1* 8/2018 Zhang .................. A61B 5/4318
2019/0365332 A1* 12/2019 Fedichev ................. A61B 5/11

OTHER PUBLICATIONS

"A Survey and Taxonomy of Cyber Foraging of Mobile Devices", IEEE Communications Surveys & Tutorials, vol. 14, No. 4, Fourth Quarter 2012, Sharifi, et al.
Safar Mariam et al: "Energy-Aware Computation Offloading in Wearable Computing", 2017 International Conference on Computer and Applications (ICCA), IEEE, Sep. 6, 2017 (Sep. 6, 2017), pp. 266-278, XP033233942.
Saha Sajeeb et al: "Compute intensive code offloading in mobile device cloud", 2016 IEEE Region 10 Conference (TENCON), IEEE, Nov. 22, 2016 (Nov. 22, 2016), pp. 436-440, XP033062251.
Jongwon Lee et al: "Task offloading technique using DMIPS in wearable devices", 2017 International Conference on Information Networking (ICOIN), IEEE, Jan. 11, 2017 (Jan. 11, 2017), pp. 414-416, XP033085167.
Golkarifard Morteza et al: "A Hitchhiker's Guide to Computation Offloading: Opinions from Practitioners", IEEE Communications Magazine, vol. 55, No. 7 , pp. 193-199, XP011656541.
Ragona Claudio et al: "Energy-Efficient Computation Offloading for Wearable Devices and Smartphones in Mobile Cloud Computing", 2015 IEEE Global Communications Conference (GLOBECOM), IEEE, Dec. 6, 2015 (Dec. 6, 2015), pp. 1-6, X P032872205.
Cheng Zixue et al: "Just-in-Time Code Offloading for Wearable Computing", IEEE Transactions on Emerging Topics in Computing, IEEE, USA, vol. 3, No. 1, Mar. 1, 2015 (Mar. 1, 2015), pp. 74-83, XP011574662.
Songchun Fan et al: "Predicting Sensory Data and Extending Battery Life for Wearable Devices", Proceedings of the 18th International Workshop on Mobile Computing Systems and Applications, Hotmobile '17, ACM Press, New York, New York, USA, Feb. 21, 2017 (Feb. 21, 2017), pp. 43-48, XP058317195.
Summons to Attend Oral Proceedings for European Application No. 17 201 078.7 dated Jul. 21, 2021.

* cited by examiner

METHOD AND DEVICES FOR PROCESSING SENSOR DATA BY APPLYING ONE OR MORE PROCESSING PIPELINES TO THE SENSOR DATA

This application is a national phase under 35 U.S.C. § 371 of PCT International Application No. PCT/EP2018/080287, which has an International filing date of Nov. 6, 2018, which claims priority to European Patent Application No. 17201078.7, filed Nov. 10, 2017, the entire contents of each of which are hereby incorporated by reference.

FIELD OF THE INVENTION

The present invention relates to the field of the analysis of sensor data. In particular, the present invention relates to a method and a system for distributed execution of sensor data processing.

BACKGROUND

Smart wearable devices typically include sensors for monitoring states of a user, e.g. health monitoring, and/or for activity tracking. A processing pipeline for analyzing sensor data, e.g. based on a trained machine learning model, may be executed locally on the wearable device.

In some cases, two wearable devices are used in parallel, and techniques for load balancing between the two devices have been proposed to maximize battery life. However, known load balancing solutions apply to simple sensing tasks and have not been designed to address the requirements of more complex data processing pipelines.

SUMMARY

It is thus an object of embodiments of the present invention to propose methods and devices for processing sensor data, which do not show the inherent shortcomings of the prior art.

Embodiments relates to a method for processing sensor data, executed by a system comprising at least two data processing devices, the system being configured for applying one or more processing pipelines to sensor data, a processing pipeline comprising successive tasks, wherein the input of a task depends on the output of a previous task, a processing device comprising at least one sensor configured for providing at least part of said sensor data, a processor configured for applying at least part of a processing pipeline, a communication interface for communication with another processing device and a battery for powering said at least one sensor, said processor and said communication interface, the method comprising:
  obtaining, by a first processing device, energy demand data representative of the energy consumption of respective tasks of a processing pipeline,
  obtaining, by said first processing device, battery availability data representative of the available energy of the batteries of the respective processing devices,
  for respective tasks of said processing pipeline, selecting, by said first processing device, one of said processing devices for executing said task, as a function of said energy demand data and said battery availability data,
  controlling, by said first processing device, the execution of the respective tasks on the selected processing devices.

Correlatively, embodiments relate to a system for applying one or more processing pipelines to sensor data, comprising at least two data processing devices, a processing pipeline comprising successive tasks, wherein the input of a task depends on the output of a previous task, a processing device comprising at least one sensor configured for providing at least part of said sensor data, a processor configured for applying at least part of a processing pipeline, a communication interface for communication with another processing device and a battery for powering said at least one sensor, said processor and said communication interface, wherein a first processing device is configured for:
  obtaining energy demand data representative of the energy consumption of respective tasks of a processing pipeline,
  obtaining battery availability data representative of the available energy of the batteries of the respective processing devices,
  for respective tasks of said processing pipeline, selecting one of said processing devices for executing said task, as a function of said energy demand data and said battery availability data,
  controlling the execution of the respective tasks on the selected processing devices.

The method may comprise:
  determining a set of execution strategies, wherein an execution strategy specifies, for respective tasks of a processing pipeline, an associated processing device for executing said task,
  determining an energy profile associated with the respective execution strategies as a function of said energy demand data, wherein the energy profile associated with an execution strategy specifies, for each processing device, the energy that would be consumed in case of applying the execution strategy,
  selecting an execution strategy as a function of said battery availability data and of said energy profiles.

In some embodiments, for an execution strategy wherein two successive task are executed on different processing devices, said energy profile is determined as a function of the energy for transmitting and receiving data on the respective processing devices.

In some embodiments, selecting an execution strategy as a function of said battery availability data comprises evaluating a cost function for the respective execution strategy, and selecting an execution strategy with the lowest cost.

In some embodiments, said cost function evaluated for an execution strategy provides a value representative of a difference of battery levels after executing said execution strategy.

The method may comprise determining the energy demand data associated with a processing pipeline as a function of the energy consumed during a previous execution of said processing pipeline.

In some embodiments, wherein said one or more processing pipelines comprises a model processing pipeline and/or a model retraining pipeline, wherein the model processing pipeline comprises a sensing task for obtaining sensor data, a feature extraction task for determining features as a function of the sensor data, and a context recognition task for applying a trained machine learning model on the features, and wherein the model retraining pipeline comprises a model validation task for determining whether a machine learning model is valid, a data retrieval task for obtaining training data, and a model retraining task.

In some embodiments, said processing devices include a pair of earpieces.

Embodiments also relate to a computer program comprising instructions for performing the method mentioned before when said instructions are executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
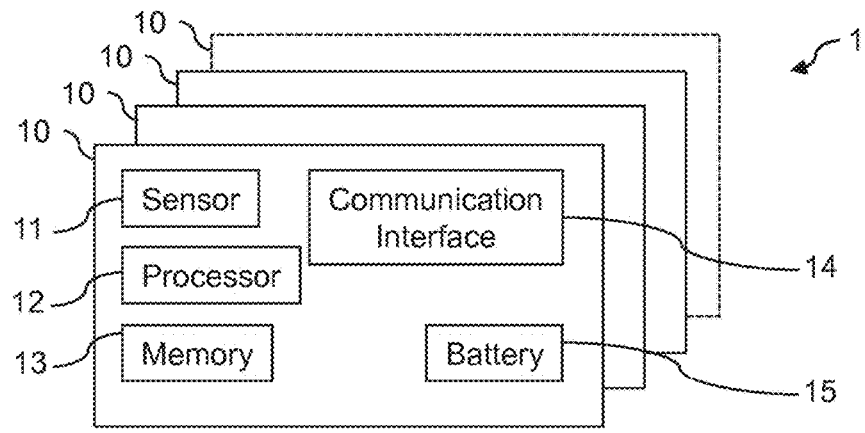
FIG. 1 is a block diagram of a system for processing sensor data.

FIG. 1 is a block diagram of a system 1 for analyzing sensor data. The system 1 comprises a plurality of (two or more) processing devices 10. A processing device 10 may be a wearable device of a user, for example an earpiece, a smartwatch, a smartphone, a smart garment. . . . The processing devices 10 may communicate with each other, for example as part of a personal area network. In an example embodiment, the system 1 comprises two processing devices 10, more specifically two earpieces.

A processing device 10 comprises one or more sensors 11, a processor 12, a memory 13, a communication interface 14 and a battery 15.

The sensors 11 are configured for providing sensor data. Examples of sensors 11 include an accelerometer, a gyroscope, a microphone, a pressure sensor (e.g. piezo-electric sensor). . . .

The processor 12 is configured for executing, at least in part, one or more processing pipelines on the sensor data. For example, the processor 12 executes a computer program stored in the memory 13, which specifies (part of) the processing pipeline.

The memory 13 may store computer programs, sensor data and other data.

The communication interface 14 allows the processing device 10 to communicate with one or more other processing devices 10. The communication between two processing devices 10 may be a wireless communication.

The battery 15 stores and provides energy for powering the processing device 10. In particular, the battery 15 powers the sensors 11, the processor 12, the memory 13 and the communication interface 14.

Two processing devices 10 of the system 1 may have the same set of sensors 11, may have overlapping sets of sensors 11, or may have different, non-overlapping sets of sensors 11. Two processing devices 10 of the system 1 may present similar design and dimensioning, for example two earpieces with the same processor type, or be more significantly different from one another, for example a smartwatch and a smartphone, wherein the smartphone has a more powerful processor and/or a larger memory and/or a larger battery than the smartwatch. . . .

By incorporating small-size sensors 11 and communication interfaces 14 in the processing devices 10, the system 1 can monitor a diversity of human contexts in an unobtrusive, non-invasive way. For example, an inertial sensor-embedded earpiece can continuously track a wearer's physical activity. A piezoelectric sensor-embedded earpiece device can monitor a wearer's heart rate by sensing in-ear pressure. A microphone-embedded earpiece can monitor meta-linguistic contexts generated from a wearer's speech and recognize his/her emotion. Like this, smart earpiece devices may adopt diverse context recognition logics and provide a number of useful services simultaneously. More generally, processing of sensor data in the system 1 may support various applications, such as health monitoring, activity tracking, user interface, context recognition. . . .

For a plurality of processing devices 10, for example two smart earpiece devices, it is useful to balance the battery lives of processing devices 10 since the whole functionality may stop if any one of the batteries dies. However, due to their small form factor, the hardware specification of earpiece devices could be different for the performance optimization, e.g., CPU, memory, and battery, which implies that the battery demand and availability will differ from each other. Also, as the earpieces become smarter, a number of complex, diverse context processing functionalities will emerge as well and consume a nontrivial amount of energy.

Accordingly, the system 1 is configured for distributed execution of one or more processing pipelines on sensor data, and for taking the battery balancing into account. More details about the distributed, battery balancing processing of sensor data by the system 1 are given hereafter.

Figure 2:
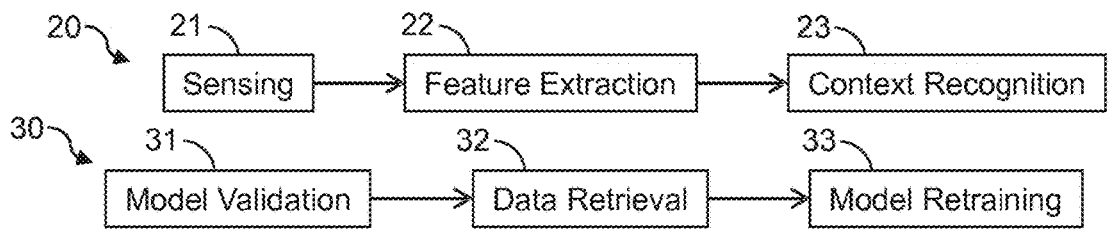
FIG. 2 is a flowchart of processing pipelines executed by the system of FIG. 1.

FIG. 2 is a flowchart of processing pipelines for processing sensor data, which may be executed by the system 1.

A processing pipeline comprises successive tasks, wherein the input of a task depends on the output of a previous task. In an embodiment, the system 1 executes two types of processing pipelines: A first type is model processing, which use a trained machine learning model for analyzing sensor data and providing useful output data. A second type is model retraining, which uses stored training data to retrain a machine learning model.

In the example of FIG. 2, a processing pipeline 20 for model processing comprises a sensing task 21, a feature extraction task 22 and a context recognition task 23. The sensing task 21 comprises sensing raw data, e.g., activating accelerometer, gyroscope, microphone, and so on. The sensing task 21 provides sensor data to the feature extraction task 22. The features extraction task 22 extracts features from the sensor data. For example, the features extraction task 22 applies one or more operators such as Fast Fourier Transform (FFT), Mel-frequency cepstral coefficients (MFCC), Mean, Standard deviation, which are commonly used in machine learning, to determines features as a function of the sensor data. The context recognition task 23 determines output data as a function of the features provided by the features extraction task 22, by applying a trained machine learning model to the features. For example, the context recognition task 23 applies one or more operator such as Decision tree, Random Forest, Support Vector Machine (SVM), Neural Network (deep learning) to the extracted features. The output data provided by the context recognition task 23 may include for example an inferred class (e.g. specifying a state of the user), a number of events (e.g. counting steps). . . . During execution of the processing pipeline 20, the system 1 may store data, such as the sensor data, the extracted features, the output data and/or data representative of user feedback on the output data. The stored data may be used as (part of) training data for subsequent retraining of the machine learning model.

In another example of FIG. 2, a processing pipeline 30 for model retraining comprises a model validation task 31, a data retrieval task 32 and a model retraining task 33. The model validations task 31 validates whether one or more models used by model processing pipelines are needed to be updated. The validation can be triggered by the periodic interval or at the applications' request. A validation criteria may be for example based on an elapse time since last retraining. If one or more models are needed to be updated, the model validation tasks 31 triggers the data retrieval task 32. The data retrieval task 32 retrieves training data. For example, the training data includes the sensor data, extracted features, output data and/or data representative of user feedback on the output data stored during execution of a processing pipeline 20 for model processing. The training data may be stored in a distributed manner in the memories 13 of processing devices 10 and data retrieval task 32 may comprise transferring part of the training data from one processing device 10 to another processing device 10. Finally, the model retraining task 33 retrain the one or more models as a function of the training data. The updated model may be used in subsequent execution of processing pipelines 20. The updated model may be transferred from the processing device 10 which executed the model retraining task 33 to one or more other processing devices 10.

A processing pipeline may be executed in a distributed manner in the system 1. For example, a first task may be executed on a first processing device 10, and a second task may be executed on a second processing device 10. Also, a task may comprise a plurality of sub-tasks which may be executed on different processing devices 10. For example, the sensing task 21 may comprises sensing data from a pressure sensor and from an accelerometer. The pressure sensing may be executed on a first processing device 10 and the accelerometer sensing may be performed on a second processing device 10.

Accordingly, a given processing pipeline may be associated with a plurality of execution strategies: For each task or subtask, a given processing device 10 is selected for execution. Referring to the example of the processing pipeline 20 executed by a system 1 comprising a pair of earpieces, the following execution strategies may be proposed:

Executing the sensing task 21, the feature extraction task 22 and the context recognition task 23 on a first earpiece (no task executed on a second earpiece)

Executing the sensing task 21 and the feature extraction task 22 on the first earpiece, and the context recognition task 23 on the second earpiece Executing the sensing task 21 on the first earpiece, and the feature extraction task 22 and the context recognition task 23 on the second earpiece Executing the sensing task 21, the feature extraction task 22 and the context recognition task 23 on the second earpiece (no task executed on the first earpiece)

Executing the sensing task 21 on the first earpiece, the feature extraction task 22 on the second earpiece and the context recognition task 23 on the first earpiece Executing the sensing task 21 on the second earpiece, the feature extraction task 22 on the first earpiece and the context recognition task 23 on the second earpiece A processing pipeline may be specified by a computer program and/or data associated with a computer program. Each processing device 10 may store the same computer program, but only execute part of it depending of the selected execution strategy. When two successive tasks are executed on the same processing device 10, execution may comprise for example a function call. When two successive tasks are executed on different processing devices 10, execution may comprise for example a remote procedure call, and involve wireless transmission of data and/or instructions.

The distributed execution of a processing pipeline implies that the successive tasks and subtasks can be identified from one another. This allow generation of distributed execution plans: The goal of this step is, with a given processing pipeline, to generate a set of distributed execution strategies. An initial step is to split the given processing tasks into successive tasks and subtasks. However, it is very challenging to dynamically split an arbitrary code (which was developed to run on a single device) into tasks to be executed in distributed processing devices 10. To address this, two approaches are proposed to generate distributed execution strategies for model processing and training: 1) a system-driven approach and 2) a developer-driven approach.

First, the system-driven approach provides developers with application programming interfaces (APIs), systematically partitions processing pipelines (made with the APIs) into tasks, and generates distributed execution strategies. It does not require any burden from developers for runtime partitioning, but cannot be applied to legacy applications.

Second, the developer-driven approach allows developers to indicate function candidates in the original code in a simple way. It requires minimum intervention from developers, but enables the legacy applications (e.g., Android Wear, Linux, . . . ) to be decomposed in successive tasks. It is important to note that these two approaches do not compete, but complement each other since our invention supports both approaches.

System-driven approach: A key intuition of the system-driven approach is that most of model processing and retraining pipelines are well structured. As mentioned before, model processing pipelines mainly consists of three major steps (sensing, feature processing, and context classification). To help developers flexibly compose customized model processing pipelines, a pipeline development tool provides two interfaces: a graphical user interface (GUI) and XML-based text interface. The pipeline development tool maintains widely-used operators and also allows developers to use customized functions as operators. These APIs enable developers to readily use them for rapid prototyping. In addition to this, more importantly, one of the biggest advantages is that it gives the understanding of underlying pipelines to the system 1. More specifically, the system 1 is able to figure out the tasks and subtasks in a given processing pipeline, distribute them over two processing devices 10, and easily exchange/merge the intermediate results.

Developer-driven approach: A key intuition of the developer-driven approach is that two earpiece devices run on the same runtime environment. Thus, a pipeline development tool may allow developers to specify function candidates based on a legacy code, which may much affect the battery usage and the system 1 dynamically determines whether to execute the candidates. For example, developers may put a simple annotation for function candidates. To support the seamless operation, the pipeline development tool loads the same binary on two earpiece devices, hooks the function calls to specified candidates, and exchange the parameter values, the internal memory, and the function output.

As shown in the aforementioned examples, these two approaches enable the system 1 to understand a given processing pipeline in a structured form of functions and their networks. As explained before, the system 1 generates distributed execution strategies by enumerating each function (in other words each task and subtask) into one of the processing devices 10, for example into either left or right earpiece device. Then, the connection between two functions can be made for example by function call (if two functions are on the same processing device 10) or remote procedure call (if they are assigned on different processing devices 10).

Figure 3:
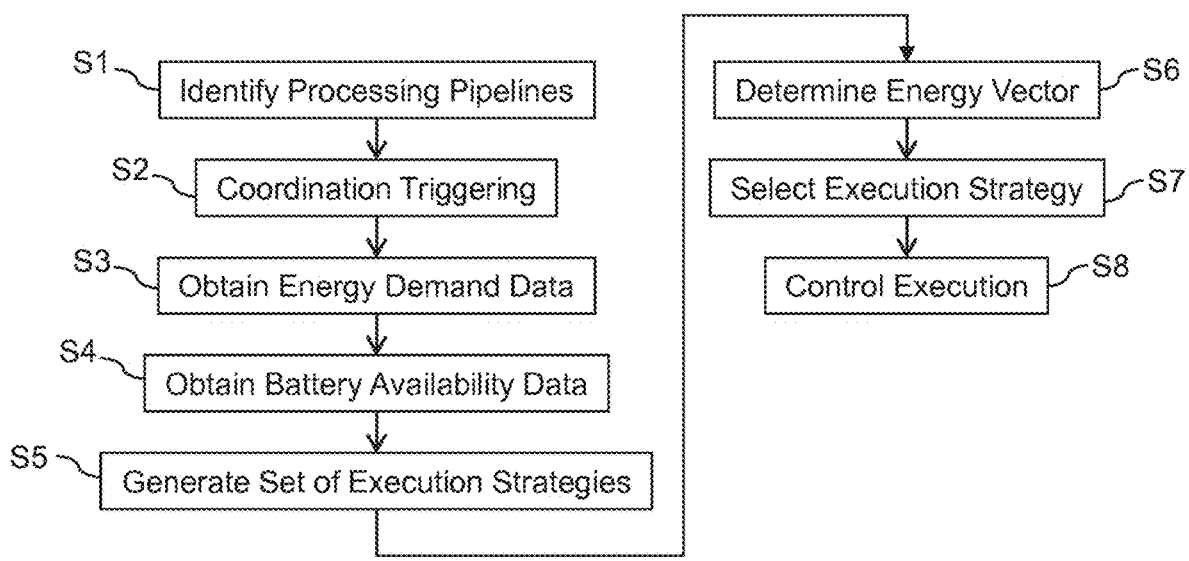
FIG. 3 is a flowchart of a method for processing sensor data, executed by the system of FIG. 1.

FIG. 3 is a flowchart of a method for processing sensor data, executed by the system 1. As explained before, the system 1 comprises a plurality of processing devices 10, wherein one or more processing pipelines may be executed in a distributed manner. A processing pipeline comprises a plurality of successive tasks which provide for a plurality of possible execution strategies.

In the system 1, a processing device 10 may be responsible for selecting an execution strategy for a processing pipeline, and controlling the distributed execution of the processing pipeline according to the selected execution strategy. This processing device 10 is referred to as the host processing device or simply the host. The other processing device(s) 10 are referred to as guest processing device(s) or simple a guest. In the example of a pair of earpieces, there would be a host earpiece and a guest earpiece. Note that the role to the host may not be fixed and may change over time.

The host processing device 10 identifies the processing pipelines which may be executed in the system 1 (Step S1). For example, when an application which uses a processing pipeline is installed in the processing devices, the host processing device 10 detects the processing pipeline. The host processing device 10 may identify the tasks and sub-tasks of the processing pipeline, for example based on the system-driven approach and/or the developer-driven approach discussed previously.

The host processing device 10 detects that coordination of the distributed execution of one or more processing pipeline should be performed (Step S2). For example, the host processing device 10 monitors coordination triggering events or criteria, such as:
  When a processing pipeline is newly registered
  When a processing pipeline is deregistered
  When any application starts to run
  When any application stops running
  Periodically
  When any of the processing devices 10 becomes (un)available The above-mentioned examples of coordination triggering events provide for a pro-active coordination, as discussed in more details below. Other examples of coordination triggering events include:
  When the battery level of any processing device 10 becomes less than a threshold (e.g., 30%)
  When the difference between battery levels of two processing devices 10 becomes more than a threshold Then, in response to detecting that coordination of the distributed execution of one or more processing pipeline should be performed, the host processing device 10 selects an execution strategy for the processing pipeline(s) and controls the execution of the selected execution strategy. More specifically:

The host processing device 10 obtains energy demand data representative of the energy consumption of respective tasks of a processing pipeline (Step S3). The information about the expected energy consumption of respective tasks of a processing pipeline can be provided by the developer or determined by the system 1. For example, a developer can associate or include data specifying expected energy consumption with a computer program specifying a processing pipeline. Also, a processing device 10 may monitor the energy consumed by the execution of a task during a given execution of a processing pipeline and store this information, which may be used later for coordination of a subsequent execution of the processing pipeline. The energy consumption a task may be expressed as an absolute value, for example in mW. The host processing device 10 may also obtain data specifying the energy necessary for transmitting, respectively receiving, data and instructions from one processing device 10 to the other. This can be obtained from device manufacturer (i.e., network interface manufacturer) or online/offline profiling.

The host processing device 10 obtains battery availability data representative of the available energy of the batteries 15 of the respective processing devices 10 (Step S4). A processing device 10 monitors, for example continuously, the available energy of its battery 15. Known battery monitoring techniques may be used for this purpose. A guest processing device 10 may send data representative of the available energy of its battery 15 to the host processing device 10, for example periodically or in response to a request of the host processing device 10. The available energy of a battery 15 may be expressed as an absolute value, for example in Joules (J), or as a percentage of a nominal absolute value. The battery availability data may include a vector or a tuple, wherein respective elements specify the energy available in the battery 15 of respective processing devices 10. This can be made by aggregating the information obtained from each processing device 10.

The host processing device 10 generates a set of execution strategies for the processing pipeline (Step S5). For example, the host processing device 10 generates all possible execution strategies by enumerating each task into the respective processing device 10. In another example, the host processing device 10 apply a constrain for limiting the set of execution strategies, for example by limiting the "back and forth" execution between two processing devices 10.

The host processing device 10 determines an energy profile associated with the respective execution strategies (step S6). The energy profile associated with an execution strategy specifies, for each processing device 10, the energy that would be consumed on said processing device 10 by the execution of the processing pipeline according to the associated execution strategy. The energy profile specifies for example a N dimensional vector, wherein N is the number of processing devices 10, and wherein each element of the vector specifies an energy-related value, for example in mW, mWl or mWh. This can be determined as a function of the distribution of tasks in the execution strategy, of the energy demand data obtained at step S5 and, in case two successive tasks are executed on different processing devices 10, of the energy necessary for transmitting, respectively receiving, data and instructions from one processing device 10 to the other. Referring to the processing pipeline 20 executed on a pair of earpieces of FIG. 2, an example is as follows:
  An execution strategy is: Executing the sensing task 21 and the Feature Extraction task 22 on the host earpiece, and the context recognition task 23 of the guest earpiece
  The energy demand data specify the following energy consumptions: Sensing task 21: 30 mW. Feature Extraction task 22: 10 mW. Context recognition task 23: 70 mW.
  Transferring the output of the Feature Extraction task 22 from the host earpiece: 50 mW. Receiving the output of the Feature Extraction task 22 on the guest earpiece: 20 mW.

Total consumption on the host earpiece: 30 mW (sensing)+10 mW (feature extraction)+50 mW (transmission)=90 mW Total consumption on the guest earpiece: 20 mW (reception)+70 mW (context recognition)=90 mW Accordingly, the energy profile associated with the execution strategy specifies a vector [90 mW, 90 mW]

Then, the host processing device 10 selects one of the execution strategies (per processing pipeline in case multiple processing pipeline should be executed) as a function of the respective energy profiles and of the battery availability data (Step S7). For example, the host processing device 10 applies a cost function for selecting the execution strategy with the lower cost. A cost function returns a cost representing a user's preference about how to select distributed execution strategies. An example preference, which may be regarded as a default policy, is to balance the battery lives of the processing devices 10. An example of corresponding cost function is to determine a value representative of the differences between battery levels, for example a mean square difference in the case of multiple processing devices 10 or an absolute difference in the case of a pair of processing devices 10. However, the system 1 can incorporate a plurality of cost functions and a user can select one of them based on his/her preferences. The cost function examples include 1) maximizing the battery life, 2) minimizing the service delay, and 3) maximizing the inference accuracy.

Then, the host processing device 10 control execution of the processing pipeline according to the selected execution strategy (Step S8). Accordingly, the host processing device 10 distributes the tasks for distributed execution.

The order of steps shown on FIG. 3 and described here before is illustrative only and may be changed. Some steps may be executed in parallel.

In the system 1, the execution of one or more processing pipelines on sensor data consumes energy. However, since the execution of successive tasks may be distributed among various processing device 10, energy consumption is also distributed. Moreover, since a distributed execution strategy is determined as a function of energy demand data and battery availability data, energy consumption may be distributed according to a desired objective, for example balancing the energy consumption. Use of the energy demand data allows to pro-actively select an appropriate execution strategy, for example in response to a coordination triggering event, even before a battery imbalance is detected.

The system 1 allows to select an appropriate distributed execution strategy for complex processing pipelines, in particular for a pipeline which requires collaboration between multiple processing devices 10. For example, a model processing pipeline may need sensor data provided by different processing devices 10 at the same time (e.g. from the pressure sensors in two earpieces, from an accelerometer in a smart watch and a location sensor in a smart phone). Similarly, a model retraining processing pipeline may need to use training data stored by multiple processing devices 10.

Multiple processing pipelines may be executed in parallel in the system 1. In that case, the coordination may be performed in parallel for each processing pipeline.

Figure 4:
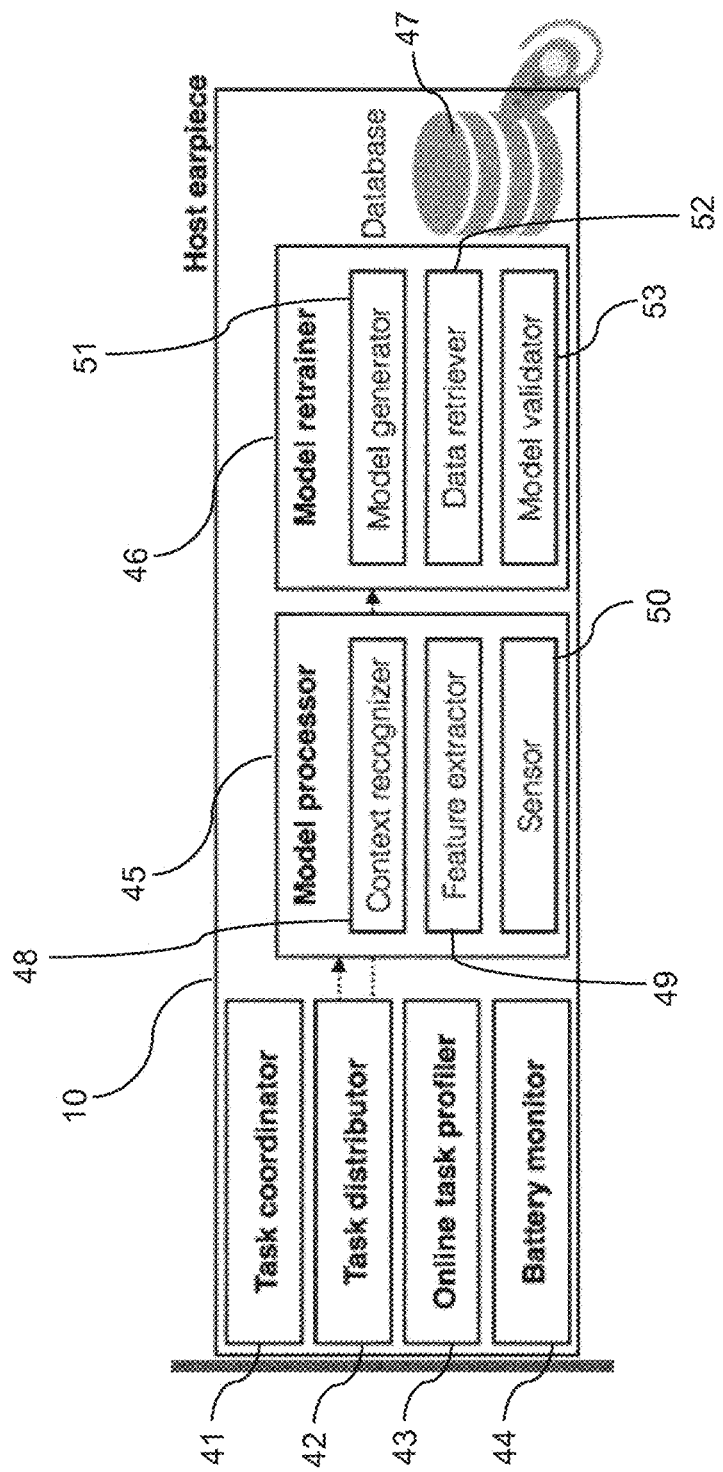
FIG. 4 is functional view of a processing device of the system of FIG. 1.

FIG. 4 is a functional view of a processing device 10. The functional modules shown on FIG. 4 may correspond to a combination of hardware and computer program, and are configured for performing parts of the method for processing sensor data described above.

The processing device 10 comprises a Task Coordinator 41, a Task Distributor 42, an Online Task Profiler 43, a Battery Monitor 44, a Model Processor 45, a Model Retrainer 46 and a Database 47.

The Battery Monitor 44 continuously monitors the remaining battery. The Online task profiler 43 estimates the expected energy consumed by the respective processing task of processing pipelines. The Task coordinator 41 in the host device monitors which processing tasks are needed to run on two earpiece devices. Upon a system's request, it dynamically determines which tasks need to run on which device and notifies it of the Task distributor 42 in each device. The decision is made based on the system policy, e.g., balancing the battery lives of two devices. Then, the Task distributor 42 distributes the tasks into the Model processor 45 and Model retrainer 46.

As described before, the processing pipeline for model processing mainly consists of three parts: sensing, feature extraction, and context recognition. Accordingly, the Model processor 45 may comprise a Sensor module 48, a Feature extractor 49 and a Context recognizer 50 for running each part, respectively. The Sensor module 48 takes in charge of sensing raw data, e.g., activating accelerometer, gyroscope, microphone, and so on. The Feature extractor 49 and Context recognizer 50 maintain a pool of operators which are commonly used in machine learning, e.g., FFT, MFCC, Mean, Stdev, and so on in the Feature extractor 49 and Decision tree, Random Forest, SVM, deep learning and so on in the Context recognizer 50. The operators can be added if necessary. For mode retraining, the Model retrainer 46 may comprises a Model validator 51 (in a host device), a Data retriever 52 and a Model generator 53. The Model validator 51 validates whether the models are needed to be updated. The validation can be triggered by the periodic interval or the applications' request. If the models are needed to be updated, the Data retriever 52 retrieves the necessary data from the database 47. The data size could be different depending on the applications' requirement. Then, the Model generator 53 regenerates the models and updates them to the Context recognizer 49.

In the context of this description, a machine learning model is a parametric model which links input data to output data. An example of machine learning model includes a neural network. A trained machine learning model is determined by applying a training algorithm to training data and determining parameters of the model. In the example of a neural network, the parameters include the weights.

It is to be remarked that the functions of the various elements shown in the figures may be provided by dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

Embodiments of the method can be performed by means of dedicated hardware and/or software or any combination of both.

While the principles of the invention have been described above in connection with specific embodiments, it is to be clearly understood that this description is made only by way of example and not as a limitation on the scope of the invention, as defined in the appended claims.

The invention claimed is:

1. A method for processing sensor data, executed by a system comprising at least two processing devices, the system being configured for applying one or more processing pipelines to sensor data,
   each processing device among the at least two processing devices comprising at least one sensor configured for providing at least part of said sensor data, a processor configured for applying at least part of a-one of the one or more processing pipelines, a communication interface for communication with another processing device of the processing devices, and a battery for powering said at least one sensor, said processor and said communication interface,
   the method comprising:
      obtaining, by a first processing device of the processing devices, energy demand data representative of an energy consumption of respective successive tasks of the one or more processing pipelines, wherein for each of the one or more processing pipelines the successive tasks of the processing pipeline are performed successively and include a first task and one or more second tasks after the first task, input to each of the one or more second tasks depending on an output of a previous task of the successive tasks,
      obtaining, by said first processing device, battery availability data representative of available energy of the battery at other ones of the processing devices,
      for each respective successive task of the successive tasks of the one or more processing pipelines, selecting, by said first processing device, one of said processing devices for executing said successive task, as a function of said energy demand data and said battery availability data, and
      controlling, by said first processing device, the execution of the respective successive tasks on the selected processing device.

2. The method according to claim 1, comprising:
   determining a set of execution strategies, wherein an execution strategy specifies, for each respective successive task of the successive tasks of the one or more processing pipelines, an associated one of the processing devices for executing said respective successive task,
   determining an energy profile associated with the respective execution strategies as a function of said energy demand data, wherein the energy profile associated with an execution strategy specifies, for each of the processing devices, the energy that would be consumed in case of applying the execution strategy,
   selecting an execution strategy as a function of said battery availability data and of said energy profiles.

3. The method according to claim 2, wherein, for an execution strategy wherein two successive tasks of the successive tasks are executed on different ones of the processing devices, said energy profile is determined as a function of the energy for transmitting and receiving data on the respective ones of the processing devices.

4. The method according to claim 2, wherein the selecting an execution strategy as a function of said battery availability data comprises evaluating a cost function for the respective execution strategy, and selecting an execution strategy with the lowest cost.

5. The method according to claim 4, wherein said cost function evaluated for an execution strategy provides a value representative of a difference of battery levels after executing said execution strategy.

6. The method according to claim 1, comprising determining the energy demand data associated with the one or more processing pipelines as a function of the energy consumed during a previous execution of said processing pipeline.

7. The method according to claim 6, wherein said one or more processing pipelines comprises at least one of a model processing pipeline and a model retraining pipeline,
   the model processing pipeline comprises successive tasks of a sensing task for obtaining sensor data, a feature extraction task for determining features as a function of the sensor data, and a context recognition task for applying a trained machine learning model on the features, and
   the model retraining pipeline comprises successive tasks of a model validation task for determining whether a machine learning model is valid, a data retrieval task for obtaining training data, and a model retraining task.

8. A non-transitory computer readable medium storing instructions, which when executed by a computer, cause the computer to perform the method of claim 1.

9. A system for applying one or more processing pipelines to sensor data, comprising:
   at least two data processing devices, wherein
   each data processing device among the at least two data processing devices comprising at least one sensor configured for providing at least part of said sensor data, a processor configured for applying at least part of the one or more processing pipelines, a communication interface for communication with another data processing device of the data processing devices and a battery for powering said at least one sensor, said processor and said communication interface,
   a first data processing device of the data processing devices is configured to
      obtain energy demand data representative of an energy consumption of respective successive tasks of the one or more processing pipelines, wherein for each of the one or more processing pipelines the successive tasks of the processing pipeline are performed successively and include a first task and one or more second tasks after the first task, input to each of the one or more second tasks depending on an output of a previous task of the successive tasks,
      obtain battery availability data representative of available energy of the battery at other ones of the data processing devices,
      for each respective successive task among the successive tasks of the at least one processing pipeline, selecting one of said data processing devices for executing said respective successive task, as a function of said energy demand data and said battery availability data, and controlling the execution of the respective successive tasks on the selected data processing device.

10. The system according to claim 9, wherein said data processing devices each include a pair of earpieces.

* * * * *